United States Patent

Heyden et al.

[15] 3,703,627

[45] Nov. 21, 1972

[54] SCANNER SYSTEM

[72] Inventors: Vander Heyden; Eric Ernest, both of Hummelstown, Pa.

[73] Assignee: AMP Incorporated, Harrisburg, Pa.

[22] Filed: Oct. 19, 1970

[21] Appl. No.: 81,708

[52] U.S. Cl. ..........................235/61.11 G, 235/92 T

[51] Int. Cl. ..............................................G06k 7/00

[58] Field of Search.......340/172.5, 174 M; 235/155, 235/61.11, 92, 92 T, 92 PE, 92 EA, 92 ME, 92 BD

[56] References Cited

UNITED STATES PATENTS

| | | | |
|---|---|---|---|
| 3,278,727 | 10/1966 | Geis | 235/92 PE |
| 3,422,422 | 1/1969 | Frank | 235/92 ME |
| 3,495,227 | 2/1970 | Cohler et al. | 340/174 M |
| 2,895,124 | 7/1959 | Harris | 235/92 |
| 3,378,822 | 4/1968 | Kaufman et al. | 340/174 M |
| 3,456,250 | 7/1969 | Barcaro | 340/174 M |

*Primary Examiner*—Maynard R. Wilbur
*Assistant Examiner*—William W. Cochran
*Attorney*—William J. Keating, Ronald D. Grefe, Gerald K. Kita, Frederick W. Raring and Jay L. Seitchik

[57] ABSTRACT

The disclosure relates to an electronic system wherein columns of data to be read out are sampled in predetermined order under control of the scanner to read out information on a column by column basis.

2 Claims, 3 Drawing Figures

PATENTED NOV 21 1972 3,703,627

SCANNER SYSTEM

This invention relates to an electronic scanner and, more specifically, to an electronic scanner for use in data reading systems whereby scanning of data is performed automatically on a column by column basis.

Data scanning systems for reading and transmitting information from a terminal to a central unit, particularly for use with data bearing cards and the like, are finding widespread acceptance with the advances in other allied arts. In many such systems, data of various types is mechanically or manually entered into a remote terminal whereupon, upon command, such data is sampled under control of a scanner, and transmitted to a central unit wherein said data can be stored, operated upon, or the like with subsequent answer back, if desired, to the remote terminal. A system of this type is disclosed in application Ser. No. (--81,985 filed Oct. 19, 1970).

In order to sample the data which has been preset into one or more settable switch units and/or indicia card receiving units, a scanner is provided which, when started, scans each of the columns in predetermined order, preferably sequentially, whereby data is read out on a column by column basis until a predetermined number of columns has been sampled whereupon the scanner is automatically reset. Scanners of this type as known to the prior art have been complex, thereby being susceptible to problems of relatively large cost and relatively high incidence of failure.

In accordance with the present invention, there is provided an electronic scanner which has a minimal number of components and is therefore highly reliable and relatively inexpensive to manufacture. Briefly, the above is accomplished by means of an oscillator, the output and starting of which are controlled by the starting circuit, the oscillator, via a NAND gate, driving a binary units counter which, after conversion to a decimal reading, controls the rows or columns of a matrix. Upon reading a predetermined count in the conversion units, a NAND gate automatically resets the counters.

It is therefore an object of this invention to provide a simple electronic scanner capable of providing essentially fault free operation.

It is a further object of this invention to provide an electronic scanner capable of scanning a predetermined number of columns and automatically stopping operation at a predetermined point at relatively low cost.

Figure 1A:
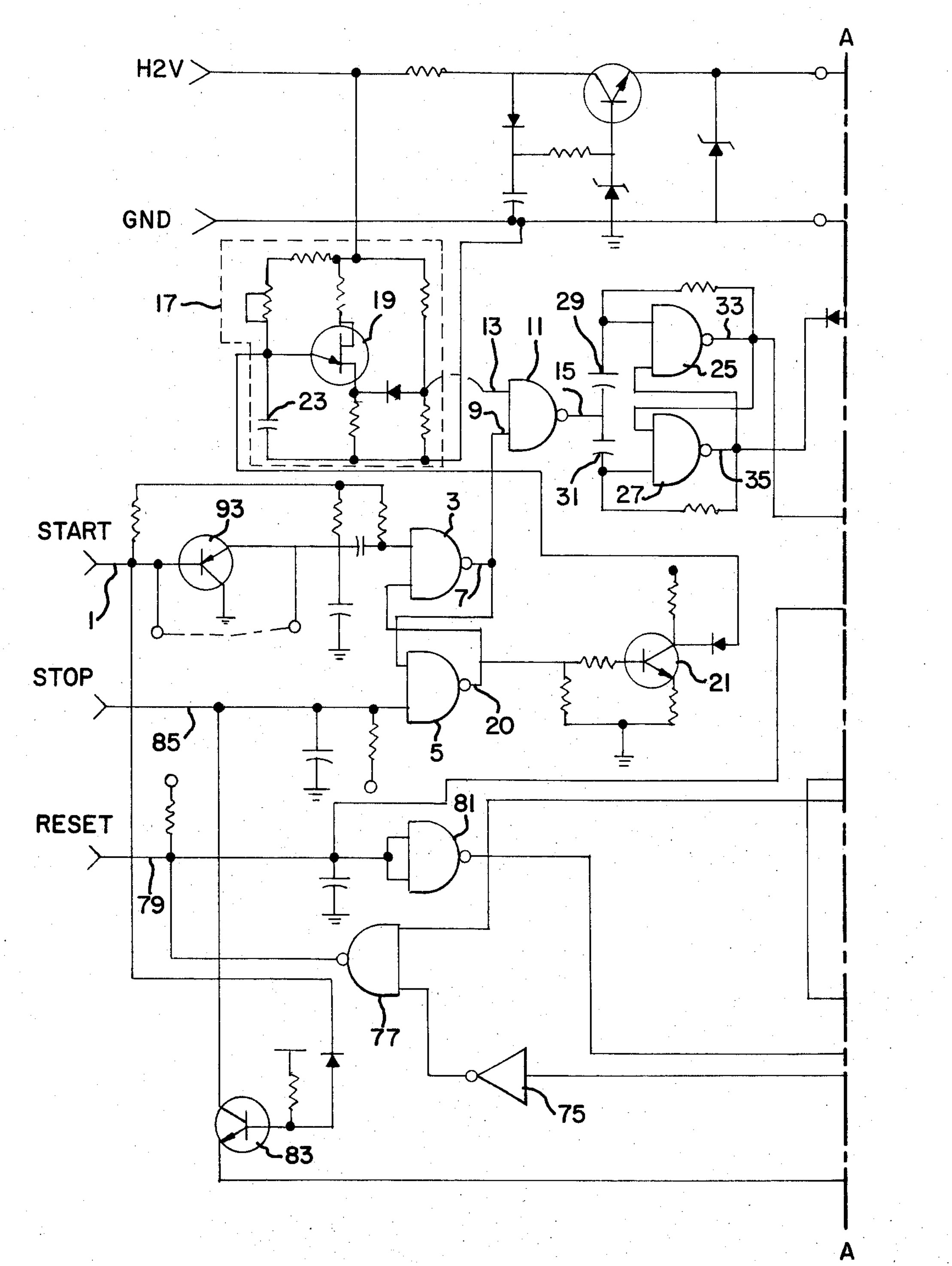
Figure 1B:
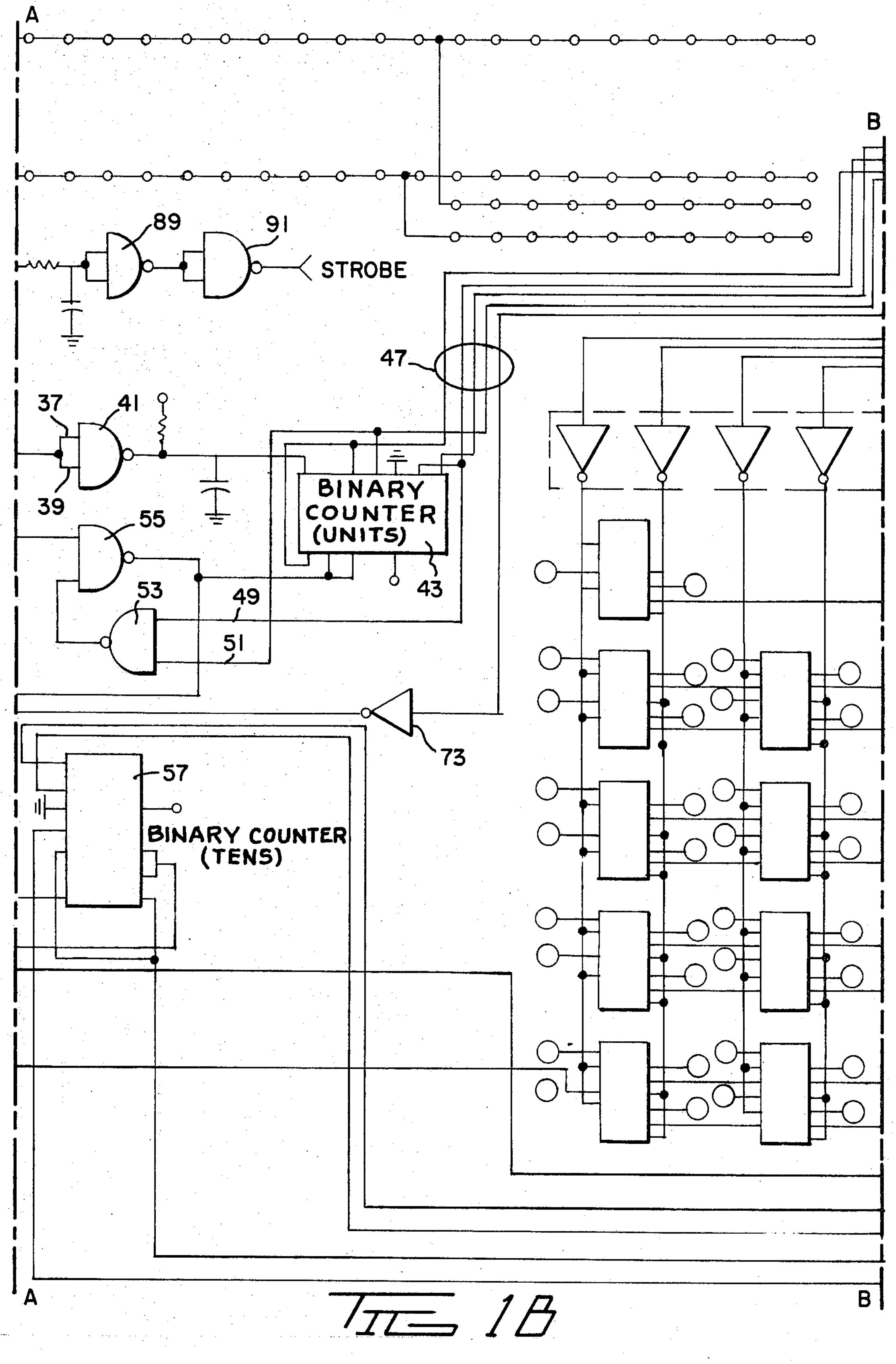
Figure 1C:
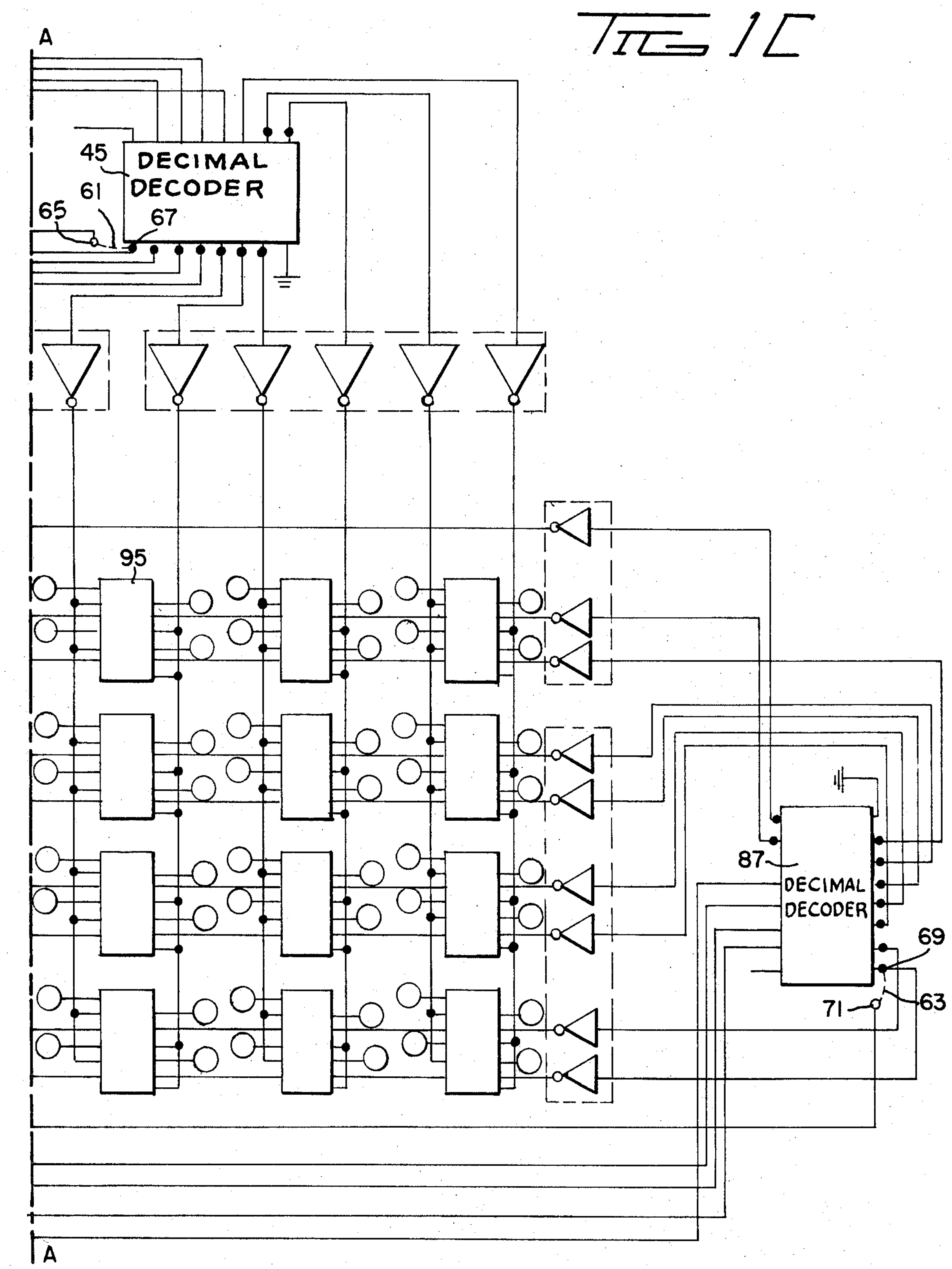

The above objects and still further objects of the invention will immediately become apparent to those skilled in the art after consideration of the following specific preferred embodiment of the invention which is provided by way of example, and not by way of limitation, wherein:

FIGS. 1A, 1B and 1C, when placed side by side, comprise a schematic circuit diagram of an electronic scanner system in accordance with the present invention.

Referring now to the figures, the system is operated by causing transistor 93 to conduct in response to operation of the start button.

By applying a closure to ground at the start input 1, the dual latch or flip flop arrangement consisting of two NAND gates 3 and 5 is caused to flip into the start position so that the terminal 7 becomes positive. This positive signal is applied to an input 9 of NAND gate 11. The input 9 of gate 11, which is positive, as soon as a pulse appears at input 13 of gate 11, satisfies the NAND gate and provides a negative going pulse at output 15 of gate 11. The pulse at input 13 is provided by an oscillator circuit 17 wherein unijunction transistor 19 provides the pulse. When terminal 20 of gate 5 goes negative, transistor 21 shuts off and turns on transistor 19 to allow capacitor 23 to charge up and start the oscillator 17 running.

The output 15 is coupled through capacitors 29 and 31 to two NAND gates 25 and 27 which are arranged in flip flop arrangement so that outputs 33 and 35 alternately go to ground. Essentially output 33 is used as the clocking output to terminals 37 and 39 of NAND gate 41, the output of which is applied to binary counter 43. The output of counter 43 is applied over lines 47 to a decimal decoder 45 which counts up to 10. Subsequent to the 10th count received in counter 43, a signal is sent via terminals 49 and 51 of NAND gate 53 through the NAND gate 55 and sends a pulse to the tens counter 57 which is a binary counter. Subsequent to the tenth unit pulse, a pulse is sent to counter 57 which in turn shifts the tens counter to the next position. This process continues until a number is reached, this number being determined by jumpers 61 and 63. These jumpers can be attached to indicate on which combination the scanner will stop. For example, if the scanner is to stop at 81, there would be a jumper from terminal 65 to terminal 67 and also a jumper from terminal 69 to terminal 71. The output of inverters 73 and 75 is applied to NAND gate 77. When this NAND gate is satisfied, it will pull down the reset bus 79. This reset bus, through NAND gate 81, will reset counter 57, which is the binary counter associated with the tens and also will reset, through NAND gate 55, counter 43 which is the binary counter 57 associated with the units 43. In addition, and everything is reset, when the tens counter and the units counter are reset to zero the scanner is in the home position which is defined as the position where both the units counter and the tens counter are at zero. In this position, transistor 83 pulls down the stop bus 85 which stops the whole process. So when the start button is operated, the scanner will scan through "80" and on the eighty-first count it will turn off and go back to "home." Counter 87 is a binary to decimal converter associated with counter 57. In addition, there is a strobe output coming out of NAND gates 27, 89 and 91 which is fed to the outside for the purpose of timing and is a delay clock pulse equivalent to half the total period of the clock pulse. It can be used to indicate to the external world that the scanner is not in a transient state and is now looking at the particular column position.

With reference now to the decoders 45 and 87, it can be seen that the outputs therefrom are in the form of a matrix which sequentially operate gates 95 in accordance with the particular outputs of the decoders which are on at that time in well known manner. The outputs of the gates 95 are each unique to the scanning of a single column by the scanner and thereby cause the scanner to scan the column associated with the gate then being operated.

Though the invention has been described with respect to a specific preferred embodiment thereof, many variations and modifications will immediately become apparent to those skilled in the art. It is therefore the intention that the appended claims be interpreted as broadly as possible in view of the prior art to include all such variations and modifications.

What is claimed is:

1. An electronic scanner which comprises a source of clock pulses, start means for activating said source of clock pulses, means responsive to said start means and activating of said source of clock pulses for transmitting said clock pulses, a pair of counting means responsive to said clock pulses, matrix means driven by said counters to provide a single output from said matrix and means responsive to a predetermined count in each of said counting means for resetting said counters, wherein said counter means includes a first counter means responsive to said clock pulses and a second counter means responsive to a predetermined count in said first counter means for stepping said second counter means, wherein said first counter means comprises a binary counter and a binary to decimal converter responsive to said binary counter, said second counter means being responsive to a predetermined count in said binary counter, wherein said second counter means comprises a binary counter and a binary to decimal converter responsive to said binary counter in said second counter means, said binary counter in said second counter means being responsive to a predetermined count of said binary counter in said first counter means to step said binary counter in said second counter means.

2. An electronic scanner which comprises a source of clock pulses, start means for activating said source of clock pulses, means responsive to said start means and activating of said source of clock pulses for transmitting said clock pulses, a pair of counting means responsive to said clock pulses, matrix means driven by said counters to provide a single output from said matrix and means responsive to a predetermined count in each of said counting means for resetting said counters, wherein said means for resetting includes variable means selectively connected to a predetermined output of said counting means, wherein said counter means includes a first counter means responsive to said clock pulses and a second counter means responsive to a predetermined count in said first counter means for stepping said second counter means, wherein said first counter means comprises a binary counter and a binary to decimal converter responsive to said binary counter, said second counter means being responsive to a predetermined count in said binary counter, wherein said second counter means comprises a binary counter and a binary to decimal converter responsive to said binary counter in said second counter means, said binary counter in said second counter means being responsive to a predetermined count of said binary counter in said first counter means to step said binary counter in said second counter means.

* * * * *